United States Patent
Schultz et al.

(10) Patent No.: US 11,275,244 B2
(45) Date of Patent: Mar. 15, 2022

(54) DOUBLE-SIDED IMAGING LIGHT GUIDE

(71) Applicant: Vuzix Corporation, West Henrietta, NY (US)

(72) Inventors: Robert J. Schultz, Victor, NY (US); Paul J. Travers, Honeoye Falls, NY (US)

(73) Assignee: Vuzix Corporation, West Henrietta, NY (US)

( * ) Notice: Subject to any disclaimer, the term of this patent is extended or adjusted under 35 U.S.C. 154(b) by 781 days.

(21) Appl. No.: 16/068,053

(22) PCT Filed: Jan. 5, 2017

(86) PCT No.: PCT/US2017/012340
§ 371 (c)(1),
(2) Date: Jul. 3, 2018

(87) PCT Pub. No.: WO2017/120341
PCT Pub. Date: Jul. 13, 2017

(65) Prior Publication Data
US 2020/0278543 A1    Sep. 3, 2020

Related U.S. Application Data

(60) Provisional application No. 62/275,558, filed on Jan. 6, 2016.

(51) Int. Cl.
*G02B 27/01* (2006.01)
*F21V 8/00* (2006.01)
*G02B 27/42* (2006.01)

(52) U.S. Cl.
CPC ......... *G02B 27/0172* (2013.01); *G02B 6/005* (2013.01); *G02B 6/0026* (2013.01);
(Continued)

(58) Field of Classification Search
CPC ............ G02B 27/0172; G02B 27/4277; G02B 6/0026; G02B 6/005; G02B 2027/0112;
(Continued)

(56) References Cited

U.S. PATENT DOCUMENTS 8,233,204 B1    7/2012  Robbins et al.
8,320,032 B2   11/2012  Levola
(Continued)

FOREIGN PATENT DOCUMENTS

EP       2196729 A1     6/2010
JP    2007219106 A     8/2007
(Continued)

OTHER PUBLICATIONS

International Search Report for International Application No. PCT/US2017/012340 dated Mar. 13, 2017.
(Continued)

*Primary Examiner* — Collin X Beatty
(74) *Attorney, Agent, or Firm* — Harter Secrest & Emery LLP; Thomas B. Ryan; Jacob D. Merrill, Esq.

(57) ABSTRACT

An imaging light guide has waveguide for conveying image-bearing light beams from an image source to an eyebox within which a virtual image can be viewed. First and second in-coupling diffractive optics direct first and second sets of the image-bearing light beams into the waveguide along different first and second paths. First and second turning diffractive optics disposed along the respective paths expand the image-bearing light beams of the first and second sets in a first dimension and direct the expanded image-bearing light beams of the first and second sets to first and second out-coupling diffractive optics. The first and second out-coupling diffractive optics further expand the image-bearing light beams of the two sets in a second dimension
(Continued)

and direct the further expanded image-bearing light beams of the two sets from the waveguide toward the eyebox.

15 Claims, 14 Drawing Sheets

(52) U.S. Cl.
CPC .. *G02B 27/4277* (2013.01); *G02B 2027/0112* (2013.01); *G02B 2027/0125* (2013.01); *G02B 2027/0174* (2013.01); *G02B 2027/0178* (2013.01)

(58) Field of Classification Search
CPC .... G02B 2027/0125; G02B 2027/0174; G02B 2027/0178
USPC .......................................................... 359/13
See application file for complete search history.

(56) References Cited

U.S. PATENT DOCUMENTS

| | | |
|---|---|---|
| 2006/0126179 A1 | 6/2006 | Levola |
| 2007/0188837 A1 | 8/2007 | Shimizu et al. |
| 2010/0202725 A1* | 8/2010 | Popovich ........... G03B 21/2033 385/10 |
| 2010/0214659 A1 | 8/2010 | Levola |
| 2013/0051730 A1 | 2/2013 | Travers et al. |
| 2013/0314789 A1* | 11/2013 | Saarikko ............ G02B 27/0905 359/489.07 |
| 2014/0140654 A1* | 5/2014 | Brown ............... G02B 27/0172 385/10 |
| 2014/0300966 A1* | 10/2014 | Travers ................ G03H 1/2205 359/558 |
| 2015/0125109 A1 | 5/2015 | Robbins et al. |
| 2017/0322419 A1 | 11/2017 | TeKolste et al. |

FOREIGN PATENT DOCUMENTS

| | | |
|---|---|---|
| JP | 2008523434 A | 7/2008 |
| JP | 2012189947 A | 10/2012 |
| JP | 2017531840 A | 10/2017 |
| WO | 2015/096859 A1 | 7/2015 |

OTHER PUBLICATIONS

International Written Opinion for International Application No. PCT/US2017/012340 dated Mar. 13, 2017.
Japanese Patent Office, Notice of Reasons for Refusal, JP Patent Application No. 2018-532307, dated Jul. 16, 2019.
European Patent Office, Extended European Search Report, EP Patent Application No. 17736339.7, dated Aug. 7, 2019.

* cited by examiner

DOUBLE-SIDED IMAGING LIGHT GUIDE

TECHNICAL FIELD

This invention generally relates to optical light guides for conveying image-bearing light to a viewer particularly for use in video eyewear or augmented or virtual reality near-eye displays.

BACKGROUND OF THE INVENTION

Head-Mounted Displays (HMDs), which include near eye displays in a form resembling conventional eyeglasses or sunglasses, are being developed for a range of diverse uses, including military, commercial, industrial, fire-fighting, and entertainment applications. For many of these applications, there is particular value in forming a virtual image that can be visually superimposed over the real-world image that lies in the field of view of the HMD user. Light guides incorporating various types of waveguides relay image-bearing light to a viewer in a narrow space, acting as exit-pupil expanders for redirecting the virtual image to the viewer's pupil and enabling this superposition function.

In the conventional light guide, collimated angularly related light beams from an image source are coupled into the light guide substrate, generally referred to as a waveguide, by an input optical coupling such as an in-coupling diffraction grating, which can be formed on a surface of the substrate or buried within the substrate. Other types of diffractive optics could be used as input couplings, including diffractive structures formed of alternating materials of variable index such as holographic polymer dispersed liquid crystal (HPDLC) or volume holograms. The diffractive optics could also be formed as surface relief diffraction gratings. The collimated light beams can be directed out of the waveguide by a similar output optical coupling, which can also take the form of a diffractive optic. The collimated angularly related beams ejected from the waveguide overlap at an eye relief distance from the waveguide forming an exit pupil within which a virtual image generated by the image source can be viewed. The area of the exit pupil through which the virtual image can be viewed at the eye relief distance is referred to as an "eyebox."

The output coupling can also be arranged for enlarging the exit pupil. For example, the collimated beams can be enlarged in one dimension by offsetting partially reflected portions of the collimated beams in a direction at which the collimated beams propagate along the output coupling or by ejecting collimated beams of different angles from different positions along the waveguide to more efficiently overlap the collimated beams at the eye relief distance from the waveguide.

A so-called "turning optic" located along the waveguide between the input coupling and the output coupling, can be used for expanding pupil size in a second dimension. The expansion can be effected by offsetting reflected portions of the collimated beam to enlarge a second dimension of the beams themselves or by directing the collimated beams to different areas of the output coupling so the collimated beams of different angles are ejected from different positions to more efficiently overlap within the eyebox. The turning optic can also take the form of a diffractive optic and, especially when located between the diffraction gratings of the input coupling and output coupling, can also be referred to as an intermediate grating.

Although conventional light guide mechanisms have provided a significant reduction in bulk, weight, and overall cost of display optics, there are still issues to resolve. Suitable separation of color channels is need in order to prevent cross-talk, in which color is processed and displayed from the wrong color channel. Cross-talk can lead to disparity between the color image data and the displayed color, and can also be a cause of objectionable color shifts, perceptible across the image field. Attempts to correct this problem have included stacking approaches in which multiple waveguides are stacked together with optional filters to prevent color from being directed to the wrong channel. Stacking, however, leads to thicker devices, adds weight, reduces brightness, and has not provided highly satisfactory results.

Thus, it can be appreciated that there is a need for improved designs that still provide the pupil expansion capabilities of the optical light guide, but allow these devices to be thinner and more lightweight, without compromising image quality and color balance.

SUMMARY OF THE INVENTION

It is an object of the present disclosure to advance the art of image presentation when using compact head-mounted devices and similar imaging apparatus. Advantageously, embodiments of the present disclosure provide an improved double-sided beam expander capable of handling two color channels within a single thickness of substrate.

These and other aspects, objects, features and advantages of the present invention will be more clearly understood and appreciated from a review of the following detailed description of the preferred embodiments and appended claims, and by reference to the accompanying drawings.

According to an aspect of the present disclosure, there is provided an imaging light guide including a waveguide for conveying image-bearing light beams from an image source to an eyebox within which a virtual image can be viewed. A first in-coupling diffractive optic directs a first set of the image-bearing light beams into the waveguide along a first path. A first turning diffractive optic disposed along the first path expands the image-bearing light beams of the first set in a first dimension and directs the expanded image-bearing light beams of the first set to a first out-coupling diffractive optic. The first out-coupling diffractive optic further expands the image-bearing light beams of the first set in a second dimension and directs the further expanded image-bearing light beams of the first set from the waveguide toward the eyebox. A second in-coupling diffractive optic directs a second set of the image-bearing light beams into the waveguide along a second path that is different from the first path. A second turning diffractive optic disposed along the second path expands the image-bearing light beams of the first set in a first dimension and directs the expanded image-bearing light beams of the second set to a second out-coupling diffractive optic. The second out-coupling diffractive optic further expands the image-bearing light beams of the second set in a second dimension and directs the further expanded image-bearing light beams of the second set from the waveguide toward the eyebox.

The first in-coupling diffractive optic can have a first in-coupling grating vector for directing the first set of the image-bearing light beams into the waveguide along the first path, the second in-coupling diffractive optic can have a second in-coupling grating vector for directing the second set of the image-bearing light beams into the waveguide along the second path, and the first in-coupling grating vector can be oriented away from the second in-coupling grating vector. Similarly, the first out-coupling diffractive optic can have a first out-coupling grating vector for directing the first set of the image-bearing light beams out of the waveguide, the second out-coupling diffractive optic can have a second out-coupling grating vector for directing the second set of the image-bearing light beams out of the waveguide, and the first out-coupling grating vector can be oriented away from the second out-coupling grating vector. Either or both the first in-coupling grating vector and second in-coupling grating vector or the first out-coupling grating vector and second out-coupling grating vector are relatively oriented away from each other by 25 to 40 degrees.

The first set of image bearing beams can comprise a first range of wavelengths and the second set of image bearing beams can comprise a second range of wavelengths that differs from the first range of wavelengths. Alternatively, the first set of image bearing beams can comprise a first range of angularly related beams and the second set of image bearing beams can comprise a second range of angularly related beams that differs from the first range of angularly related beams.

BRIEF DESCRIPTION OF THE DRAWING FIGURES

While the specification concludes with claims particularly pointing out and distinctly claiming the subject matter of the present invention, it is believed that the invention will be better understood from the following description when taken in conjunction with the accompanying drawings.

DETAILED DESCRIPTION OF THE INVENTION

Figure 1:
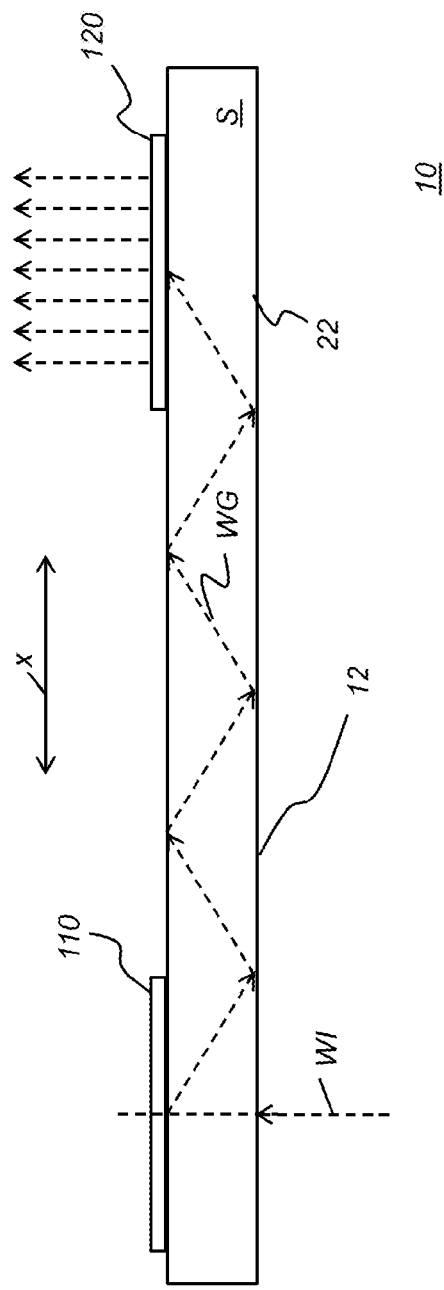
FIG. 1 is a schematic diagram that shows a simplified cross-sectional view of one possible configuration of a light guide arranged as waveguide incorporating a monocular type diffractive beam expander.

The present description is directed in particular to elements forming part of, or cooperating more directly with, apparatus in accordance with the invention. It is to be understood that elements not specifically shown or described may take various forms well known to those skilled in the art.

Where they are used herein, the terms "first", "second", and so on, do not necessarily denote any ordinal, sequential, or priority relation, but are simply used to more clearly distinguish one element or set of elements from another, unless specified otherwise. The terms "top" and "bottom" do not necessarily designate spatial position but provide relative information about a structure, such as to distinguish opposing surfaces of a planar (flat) waveguide.

In the context of the present disclosure, the terms "viewer", "operator", "observer", and "user" are considered to be equivalent and refer to the person who wears the HMD viewing device.

As used herein, the term "energizable" relates to a device or set of components that perform an indicated function upon receiving power and, optionally, upon receiving an enabling signal.

The term "actuable" has its conventional meaning, relating to a device or component that is capable of effecting an action in response to a stimulus, such as in response to an electrical signal, for example.

The term "set", as used herein, refers to a non-empty set, as the concept of a collection of elements or members of a set is widely understood in elementary mathematics. The term "subset", unless otherwise explicitly stated, is used herein to refer to a non-empty proper subset, that is, to a subset of the larger set, having one or more members. For a set S, a subset may comprise the complete set S. A "proper subset" of set S, however, is strictly contained in set S and excludes at least one member of set S.

In the context of the present disclosure, the term "oblique" means at an angle that is not an integer multiple of 90 degrees. Two lines, linear structures, or planes, for example, are considered to be oblique with respect to each other if they diverge from or converge toward each other at an angle that is at least about 5 degrees or more away from parallel, or at least about 5 degrees or more away from orthogonal.

In the context of the present disclosure, the terms "wavelength band" and "wavelength range" are equivalent and have their standard connotation as used by those skilled in the art of color imaging and refer to a range of light wavelengths that are used to form one or more colors in polychromatic images. Different wavelength bands are directed through different color channels, such as to provide red, green, and blue primary colors in conventional color imaging applications.

As an alternative to real image projection, an optical system can produce a virtual image display. In contrast to methods for forming a real image, a virtual image is not formed on a display surface. That is, if a display surface were positioned at the perceived location of a virtual image, no image would be formed on that surface. A virtual image display has a number of inherent advantages for an augmented reality display. For example, the apparent size of a virtual image is not limited by the size or location of a display surface. Additionally, the source object for a virtual image may be small; a magnifying glass, as a simple example, provides a virtual image of its object. In comparison with systems that project a real image, a more realistic viewing experience can be provided by forming a virtual image that appears to be some distance away. Providing a virtual image also obviates any need to compensate for screen artifacts, as may be necessary when projecting a real image.

In the context of the present disclosure, the term "coupled" is intended to indicate a physical association, connection, relation, or linking, between two or more components, such that the disposition of one component affects the spatial disposition of a component to which it is coupled. For mechanical coupling, two components need not be in direct contact, but can be linked through one or more intermediary components. A component for optical coupling allows light energy to be input to, or output from, an optical apparatus. The terms "beam expander" and "pupil expander" are considered to be synonymous, used interchangeably herein.

FIG. 1 is a schematic diagram that shows a simplified cross-sectional view of one conventional configuration of a light guide 10 arranged as a monocular type light diffractive beam expander or exit pupil expander comprising an input coupling element such as an in-coupling diffractive optic 110, and an output coupling element, such as an out-coupling diffractive optic 120 arranged on a transparent and planar waveguide 22 having a substrate S. In this example, in-coupling diffractive optic 110 is shown as a reflective type diffraction grating; however, in-coupling diffractive optic 110 could alternately be a transmissive diffraction grating, volume hologram or other holographic diffraction element, or other type of optical component that provides diffraction for the incoming, image-bearing light, arranged on a lower surface 12 of the waveguide substrate S, where the incoming light wave WI first interacts with the waveguide substrate S.

When used as a part of a virtual display system, in-coupling diffractive optic 110 couples each of a plurality of angularly related in-coming image-bearing light beams WI from an imager, via suitable front end optics (not shown), into the substrate S the waveguide 22. The input light beams WI are diffracted by in-coupling diffractive optic 110. For example, first order diffracted light propagates as an angularly related set of beams WG along the substrate S, moving toward the right in the FIG. 1 system, toward out-coupling diffractive optic 120. Between gratings or other types of diffractive optics, light is channeled or directed along the waveguide 22 by Total Internal Reflection (TIR). Out-coupling diffractive optic 120 contributes to beam expansion via multiple diffractive encounters with the propagating light beams WG along its length, i.e., along the x-axis in the view of FIG. 1, and directs the diffracted light from each encounter outwards towards the intended location of an observer's eye.

Figure 2:
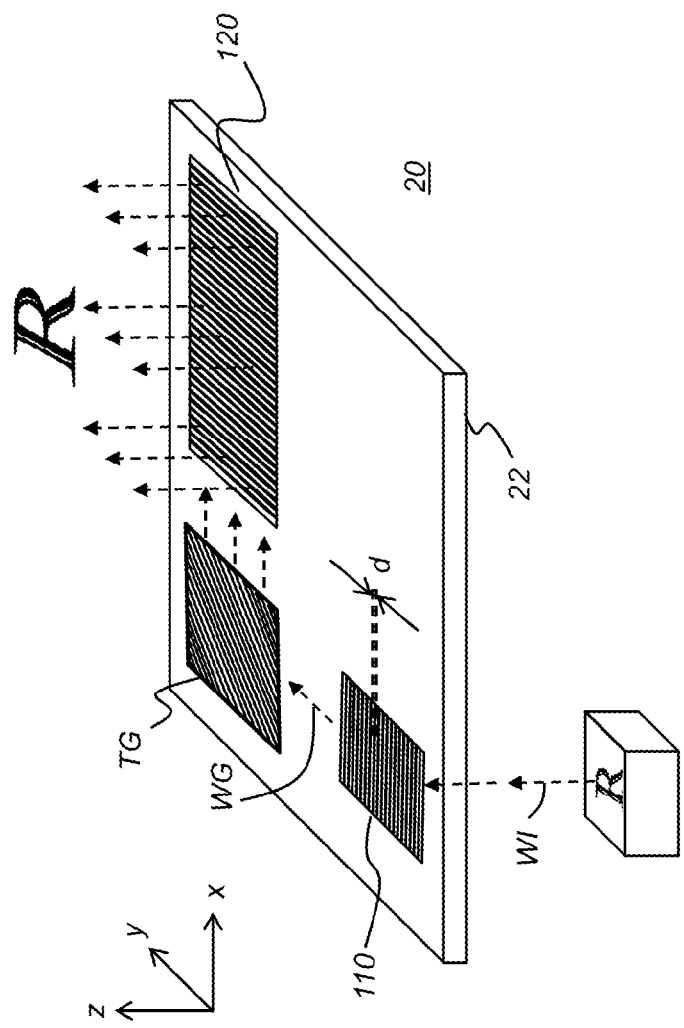
FIG. 2 is a perspective view that shows a light guide arranged as waveguide incorporating a diffractive beam expander including a turning grating.

The perspective view of FIG. 2 shows an imaging light guide 20 arranged as a known beam expander that provides beam expansion along x- and y-axes using an intermediate turning grating TG to redirect the light output (first diffracted mode) from in-coupling diffractive optic 110 to out-coupling diffractive optic 120. In the FIG. 2 device, in-coupling diffractive optic 110 containing periodic rulings with a period d diffracts angularly related incoming input optical beams WI into the waveguide 22 as a set of angularly related beams WG, propagating by total internal reflection in an initial direction towards the intermediate turning grating TG. Intermediate grating TG is termed a "turning grating" because of its function in the optical path, redirecting the beams WG from within the waveguide 22 according to its grating vector in a direction towards the out-coupling diffractive optic 120, thereby accounting for a difference in angle between the grating vectors of the in-coupling diffraction optic 110 and the out-coupling diffraction optic 120. Intermediate grating TG, which has angular orientation of diffraction elements and a spacing geometry determined by spacing period d, not only redirects the internally reflected beams WG but also contributes to beam expansion via multiple diffractive encounters with the light beams WG along the initial direction of propagation, i.e., along the y-axis in the view of FIG. 2. The out-coupling diffractive optic 120 contributes to an orthogonal beam expansion via multiple diffractive encounters with the light beams WG along the redirected direction of propagation, i.e., along the x-axis in the view of FIG. 2.

The grating vectors, generally designated k and shown with subscripts where they are specific to light within a color channel, extend parallel to the plane of the waveguide surface and are in the direction of the periodicity of the in-coupling and out-coupling diffractive optics 110 and 120, respectively.

In considering a light guide design used for imaging it should be noted that image-bearing light traveling within a waveguide is effectively encoded by the in-coupling optics, whether the in-coupling mechanism uses gratings, holograms, prisms, mirrors, or some other mechanism. Any reflection, refraction, and/or diffraction of light that takes place at the input must be correspondingly decoded by the output in order to re-form the virtual image that is presented to the viewer.

A turning grating TG, placed at an intermediate position between the input and output couplings, such as the in-coupling and out-coupling diffractive optics 110 and 120, is typically chosen to minimize any changes on the encoded light. As such, the pitch of the turning grating preferably matches the pitch of the in-coupling and out-coupling diffractive optics 110 and 120. In addition, the virtual image can be preserved by orienting the turning grating at around 60 degrees to in-coupling and out-coupling diffractive optics 110 and 120 in such a way that the encoded ray bundles are turned 120 degrees by one of the 1st reflection orders of the turning grating TG. The diffractive effects of the turning grating TG are most pronounced on the vector component of the incoming rays that are parallel to the grating vector of the turning grating. Turning gratings so arranged redirect ray bundles within the guide substrate while minimizing any changes to the encoded angular information of the virtual image. The resultant virtual image in such a designed system is not rotated. If such a system did introduce any rotation to the virtual image, the rotational effects could be non-uniformly distributed across different field angles and wavelengths of light, thus causing unwanted distortions or chromatic aberrations in the resultant virtual image.

The use of turning grating TG as envisioned for certain embodiments described herein preserves an inherent geometrical accuracy to the design of the light guide 20 so that the input beam and output beam are symmetrically oriented with respect to each other. With proper grating TG spacing and orientation, grating vectors k direct the light from the in-coupling diffractive optic 110 to the out-coupling diffractive optic 120. It should be noted that the image that is formed for the imaging light guide viewer is a virtual image, focused at infinity or at least well in front of the light guide 20, but with the relative orientation of output image content to input image content preserved. A change in the rotation about the z axis or angular orientation of incoming light beams WI with respect to the x-y plane can cause a corresponding symmetric change in rotation or angular orientation of outgoing light from out-coupling diffractive optic (ODO) 120. From the aspect of image orientation, turning grating TG is intended to function as a type of optical relay, providing expansion along one axis of the image that is input through the in-coupling diffractive optic (IDO) 110 and redirected to out-coupling diffractive optic (ODO) 120. Turning grating TG is typically a slanted or square grating or, alternately, can be a blazed grating. Reflective surfaces can alternately be used for turning the light toward the out-coupling diffractive optic 120.

Beam expansion in two different dimensions is provided when using the arrangement of FIG. 2. Turning grating TG expands the diffracted beam from in-coupling diffractive optic 110 in the y direction as shown. Out-coupling diffractive optic 120 further expands the diffracted beam in the x direction, orthogonal to the y direction as shown.

The known imaging light guide 20 that is shown in FIG. 2 has been used in a number of existing head-mounted device (HMD) designs for providing image content to a viewer. This type of beam expander is particularly well-suited to augmented reality applications in which image content can be superimposed on a real-world view as seen through the transparent imaging light guide.

One acknowledged shortcoming of the known imaging light guide beam expander relates to color quality. By design, a diffraction grating is optimized for a particular wavelength, with progressively degrading imaging performance as wavelengths deviate further from the specified wavelength. Moreover, not only does performance shift according to wavelength, but changes in incident angle have more pronounced effects that vary with wavelength differences. Because of this, undesirable color shifts can be perceived across an image field when using the known type of diffractive beam expander. The color shift problem proves extremely difficult to compensate for in software, since the amount of color shift can vary widely across the image field.

One approach for addressing the color shift problem is using separate waveguides to serve the different primary color channels, with diffraction elements suitably designed for handling light of different wavelength bands. One proposed approach stacks of multiple waveguides to effect beam expansion. Stacking can be used to delegate the separate red (R), blue (B), and green (G) color channels to individual waveguides, wherein the diffractive components for each waveguide are designed suitably for light of different wavelength bands. Cross-talk between color channels is reduced using stacked waveguides with separate diffraction gratings and optional color filters.

While stacking approaches can achieve some measure of channel separation, the added weight, size, complexity, and cost of stacked waveguide solutions can be significant. It can readily be appreciated that solutions that would provide separate color channels within a single waveguide, without appreciable color channel crosstalk, would be advantageous for helping to reduce color shifts and improve color quality overall.

Double-Sided Imaging Light Guide

Figure 3A:
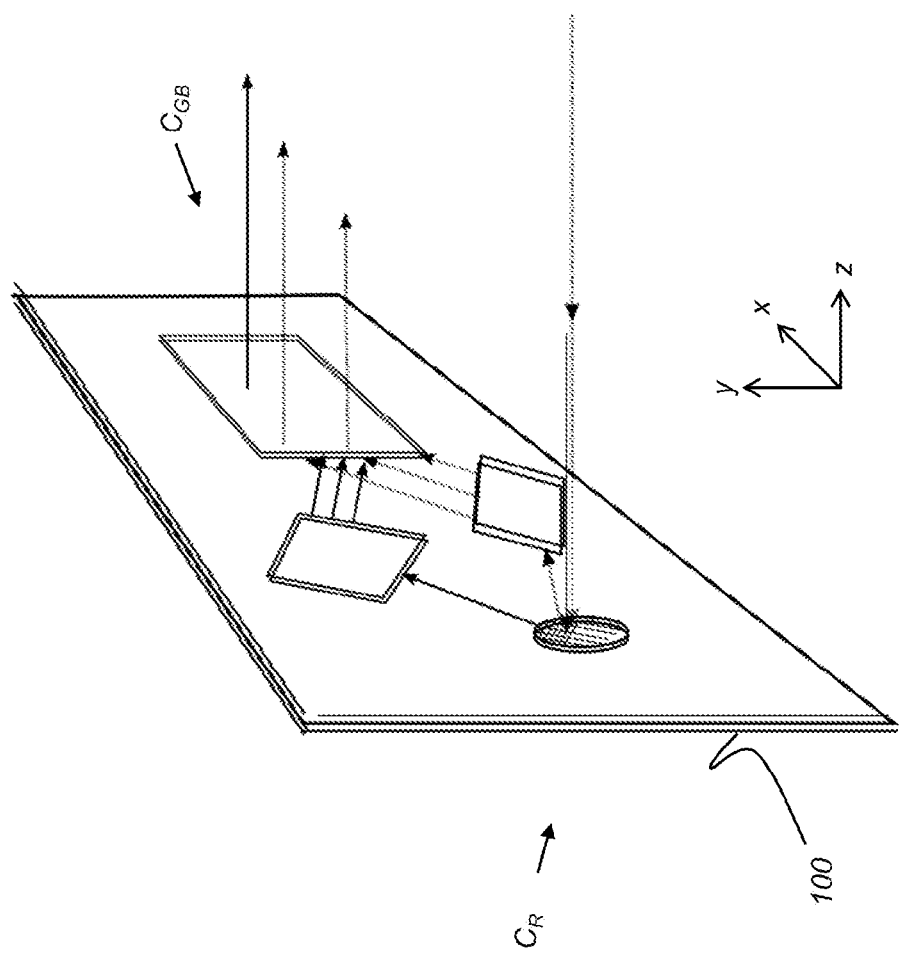
FIG. 3A is a perspective view that shows a light guide arranged as waveguide incorporating a double-sided diffractive beam expander.

FIG. 3A is a perspective view that shows an embodiment of an imaging light guide 100 having two color channels $C_R$ and $C_{BG}$ and formed on a single substrate. Color channels $C_R$ and $C_{BG}$ can be centered at wavelengths that are at least 50 nm apart, for example. Imaging light guide 100 is formed as a double-sided diffractive beam expander, eliminating the need for stacked waveguide solutions in order to reduce color channel crosstalk. Image-bearing light for both color channels is incident on an in-coupling diffractive optic $110_{BG}$ that diffracts the light of one of two color channels into the light guide 100.

Figure 3B:
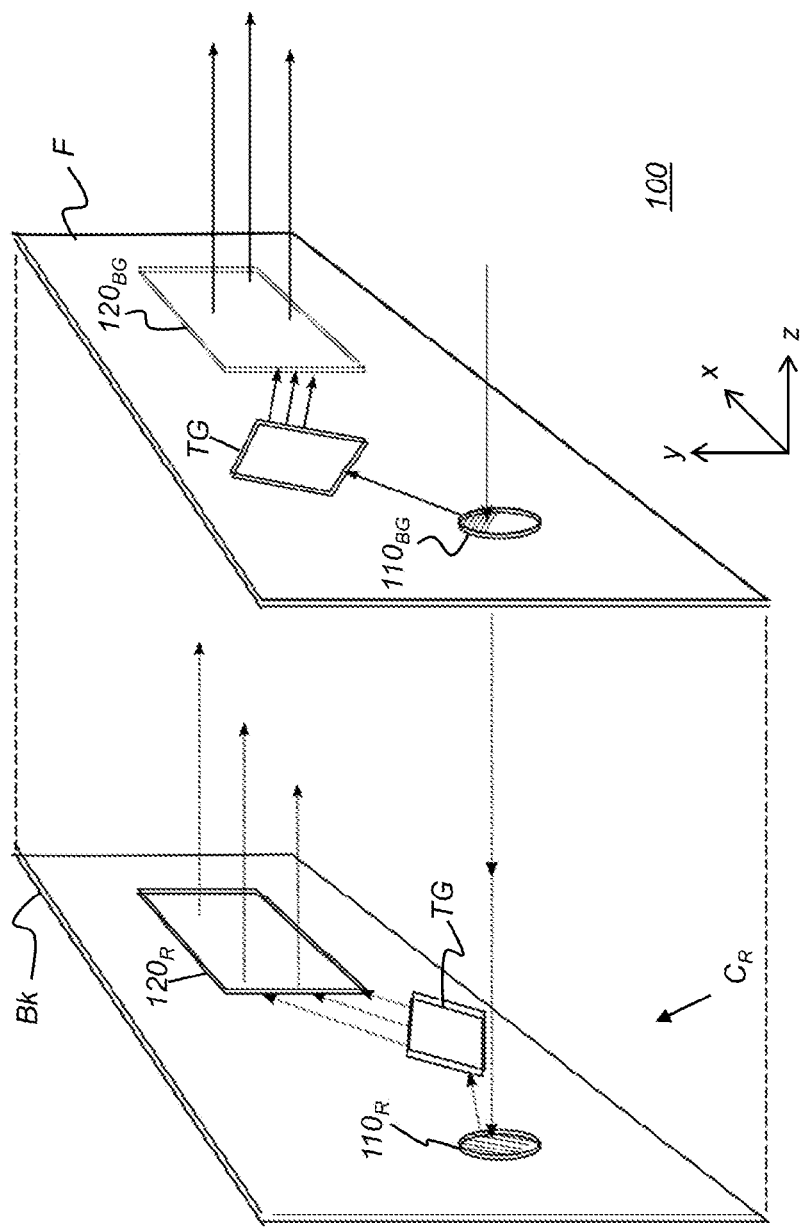
FIG. 3B is an exploded view of the FIG. 3A embodiment showing the distribution of components for two different color channels on front and back surfaces of the waveguide.

FIG. 3B is an exploded view that shows an embodiment of an imaging light guide 100 of FIG. 3A having two color channels and formed on a single waveguide substrate S. The exploded view visually separates the front and back surfaces F and Bk, respectively, of the substrate S from each other. It must be emphasized that there is only a single waveguide of substrate S; each surface of the substrate S has the diffractive structures that serve one of the two color channels. Components shown on the right (front surface F) portion are primarily for one channel; components shown on the left (back surface Bk) are for a second channel. In the example shown, one color channel $C_{BG}$ is provided for green and blue light (from about 450-550 nm); a second color channel $C_R$ is provided for red light (from about 610-780 nm). Color channel $C_{BG}$ has diffractive elements $110_{BG}$, $120_{BG}$ and $TG_{BG}$ formed on the front surface F of substrate S. Color channel $C_R$ has diffraction elements $110_R$, $120_R$ and $TG_R$ formed on the rear or back surface Bk of substrate S. For the respective color channels, the in-coupling diffractive optics $110_R$ and $110_{BG}$ align with each other along a common normal to the parallel front and back surfaces F and Bk. Similarly, the out-coupling diffractive optics $120_R$ and $120_{BG}$ also align along a common normal to the front and back surfaces F and Bk. The respective turning gratings $TG_R$, $TG_{BG}$ are not similarly aligned.

It should be noted that any of a number of arrangements of color channels and their associated bandwidth ranges can be used, such as including green and red wavelength bands within one color channel and blue wavelength bands in another color channel.

Cross-Talk Concerns

Cross-talk between color channels can be a problem with any type of imaging system, including arrangements using multiple stacked waveguides, but is a particular concern for designs using a single waveguide. One approach for defeating crosstalk separates the optical paths within the light guide as much as is possible, both in terms of angle and of distance. For the example, as shown in FIGS. 3A and 3B, the path of the red light in color channel $C_R$ is separated from the path of the blue-green light in color channel $C_{BG}$ by both angle and distance, so that "leakage" of light to the wrong color path does not occur or is negligible. Although this goal is straightforward, conventional methods for achieving this goal have not been highly successful. Embodiments of the present disclosure, however, provide methods for color channel separation that make it possible to design and use a pupil expander formed on a single substrate.

Figure 4A:
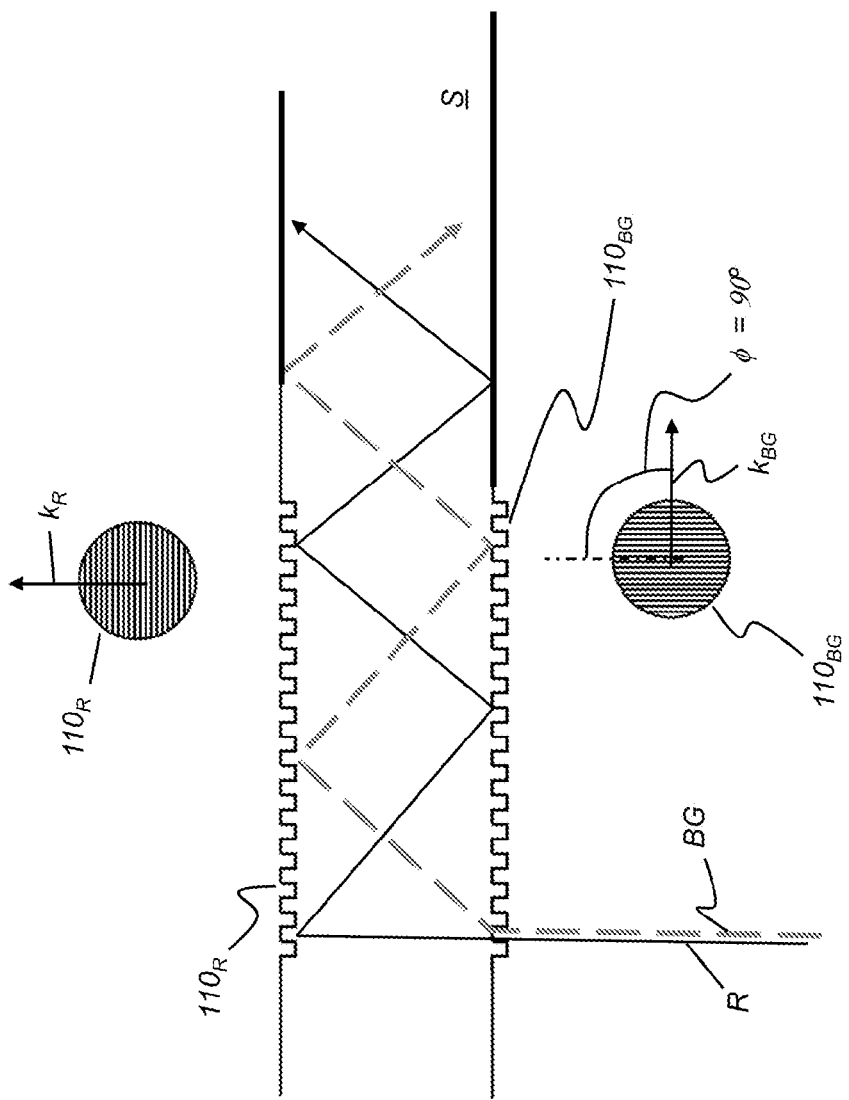
FIG. 4A is a side view that shows the input end of the light guide with opposing in-coupling diffractive optics for a double-sided diffractive beam expander. Respective grating orientations are illustrated in a plan view.

For a better understanding of the solutions proposed herein, it is instructive to examine the behavior of different parts of the optical system in light of the cross-talk prevention strategy outlined above. FIG. 4A is a side view that shows the arrangement and behavior of in-coupling diffractive optics $110_{BG}$ and $110_R$. Blue/green light, shown by a dashed line BG, is diffracted by in-coupling diffractive optic $110_{BG}$ into the waveguide substrate S and propagates within the substrate S via TIR. A portion of this light reflects from in-coupling diffractive optic $110_R$ and also reflects from in-coupling diffractive optic $110_{BG}$ as it moves along the substrate. Red light, indicated by a solid line R, transmits through in-coupling diffractive optic $110_{BG}$ and is diffracted, in reflection, by in-coupling diffractive optic $110_R$ for propagation within the substrate S via TIR.

Figure 4B:
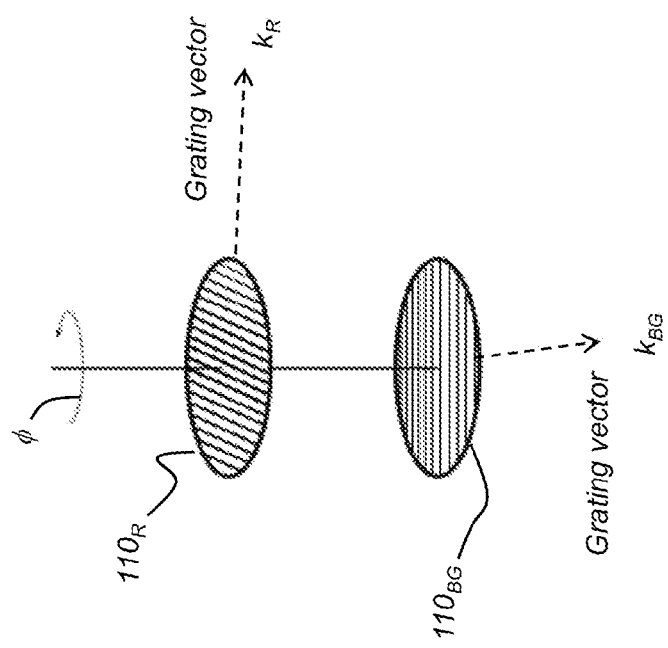
FIG. 4B is a perspective view that shows the relative rotational orientations of the in-coupling diffractive optics for the two different color channels and their corresponding grating vectors.

Because it is a side view, FIG. 4A cannot show the angular difference between light diffracted from each in-coupling diffractive optic 110 in the plane of substrate S. Returning for a moment to the perspective view of FIG. 3B, it can be seen that the R and the BG light beams trace different paths from in-couplings $110_R$ and $110_{BG}$, according to grating rotation. In FIGS. 4A and 4B, grating rotation, corresponding to the angular distance between grating vectors $k_R$ and $K_{BG}$, is represented by a rotation angle $\phi$, shown in top view relative to the upper and lower in-coupling diffractive optics $110_{BG}$ and $110_R$ in FIG. 4A and in perspective view in FIG. 4B.

The grating direction, corresponding to the grating vectors $k_R$ and $k_{BG}$, determines the path of light that is diffracted by each in-coupling diffractive optic $110_R$ and $110_{BG}$. Peak separation between paths is achieved when the paths of the R and BG light beams are orthogonal to each other; this maximum path separation occurs when rotation angle $\phi$ is at or very near 90 degrees. As angle $\phi$ decreases somewhat from 90 degrees, entry of light into the wrong path and resulting cross-talk become increasingly more likely.

In each color channel $C_{BG}$ and $C_R$, the respective turning grating $TG_{BG}$ and $T_{GR}$ redirect incident light from the waveguide at a nominal 60 degree angle. The turning gratings $TG_{BG}$ and $T_{GR}$ are designed and oriented specifically to provide this behavior and generally operate to accept diffracted light input and provide redirected light output at this comparatively fixed angle.

Out-coupling diffractive optics $120_{BG}$ and $120_R$ that face each other (formed on opposite surfaces along a common normal) provide best performance with input light that is orthogonal. Out-coupling diffractive optics $120_{BG}$ and $120_R$ then have their relative grating angles at orthogonal to each other. At the out-coupling optics $120_{BG}$ and $120_R$, the likelihood of color channel cross-talk increases as grating angles and incident angles diverge from orthogonal.

The geometric constraints on respective angles needed for best performance of in-coupling and out-coupling diffraction gratings, as outlined above, cannot be met without making at least some type of compromise. The turning grating, for example, provides some small degree of adjustability for turning angle $\theta$, based on the pitch $P_{new}$, which can be generally computed based on the input pitch $P_{input}$, using:

$$P_{new} = P_{input}(2 \cos \theta)$$

Thus, for turning light from an in-coupling diffractive grating 110 having a 350 nm pitch, a turning grating TG having a 305 nm pitch would be required to provide a turning angle $\theta$ of 55 degrees. Achieving a smaller turn angle would require a very high pitch that might easily be too difficult or costly to fabricate. For example, a 272 nm pitch grating would be required for a turning angle $\theta$ of 50 degrees. Thus, although it can be possible to adjust the turning angle by a few degrees, it is far more practical to make some adjustment to the respective rotational angles $\phi_{IN}$ and $\Phi_{OUT}$ between in-coupling diffractive optics $110_R$ and $110_{BG}$ and out-coupling diffractive optics $120_R$ and $120_{BG}$ to angles less than the ideal orthogonal angle.

Figure 5:
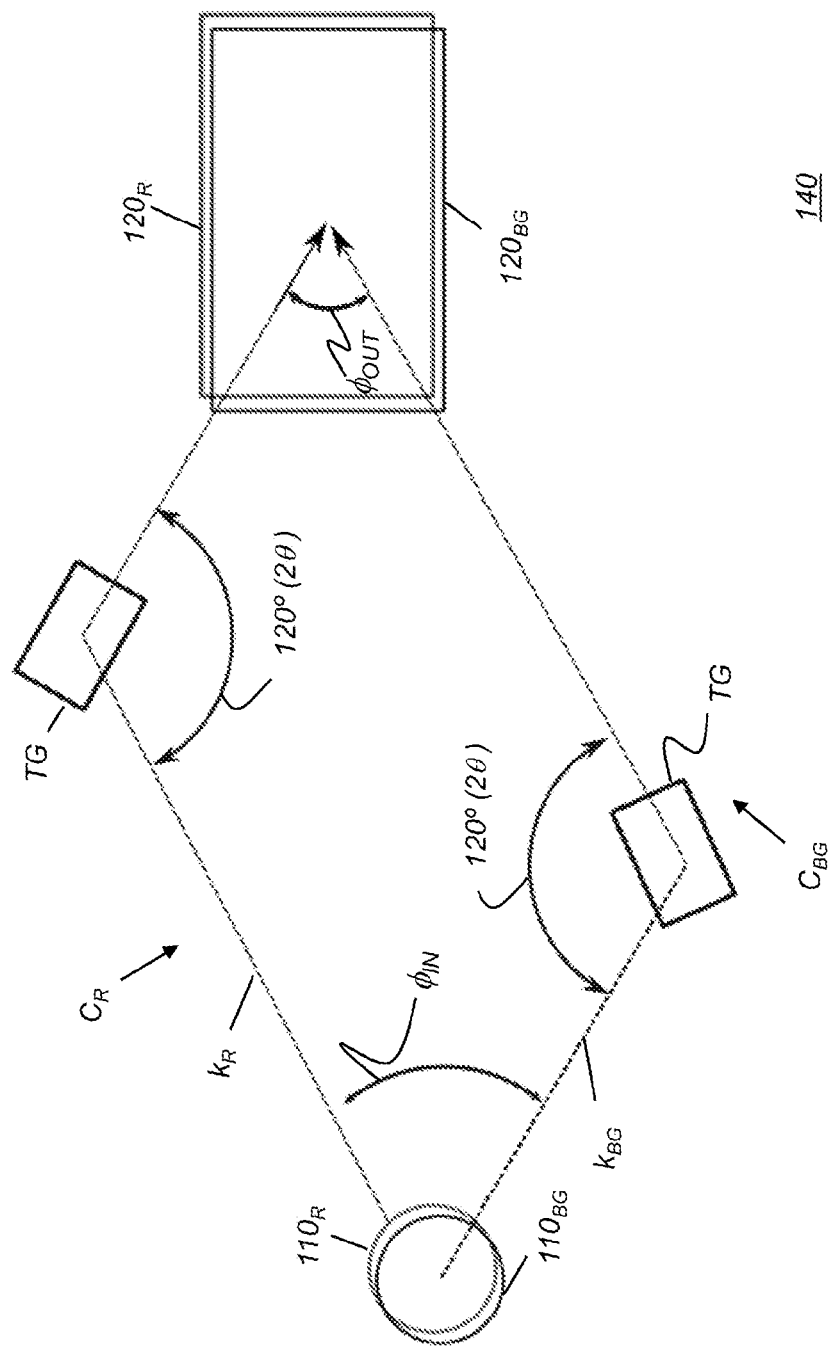
FIG. 5 is a top view that shows a lay out of components of a double-sided light guide according to one approach for separating color channels with both in-coupling and out-coupling diffractive optics being relatively rotated between opposite sides of the waveguide.

Adjusting the gratings rotation angles so that components fit within the conventional waveguide footprint and so that rotation angles for facing diffraction gratings differ by the largest possible angle yields the beam expander 140 design shown in FIG. 5. Overlaying or facing gratings are shown as slightly offset for clarity; in practice, facing in-coupling and out-coupling optics are precisely aligned with each other, as described previously. Here, angle $\phi_{IN}$ between gratings rotations for in-coupling diffractive optics $110_{BG}$ and $110_R$ is 60 degrees. Out-couplings $120_{BG}$ and $120_R$ have their grating vectors similarly rotated through angle $\Phi_{OUT}$ with respect to each other by 60 degrees in the plane of the waveguide.

The arrangement shown in FIG. 5 is workable and provides a two-channel solution on a single substrate. Color channel crosstalk with this arrangement, however, is still clearly perceptible, indicating that the color paths inadvertently "leak" into each other even at the relatively high gratings rotation angles that are used. The persistence of color crosstalk with the configuration of FIG. 5 strongly suggests that further compromising the desired angular rotations would be undesirable.

While color crosstalk that results from channel proximity remains a factor that must be considered, gratings rotation angle differences $\phi$ of much less than 60 degrees can provide more favorable performance than the arrangement of FIG. 5. Surprisingly, respective rotation angles of less than 40 degrees have been found to be favorable for reduced crosstalk where diffractive gratings or other diffractive optics face each other on opposite sides of a substrate, such as for in-coupling diffractive optics 110 and out-coupling diffractive optics 120.

Figure 6:
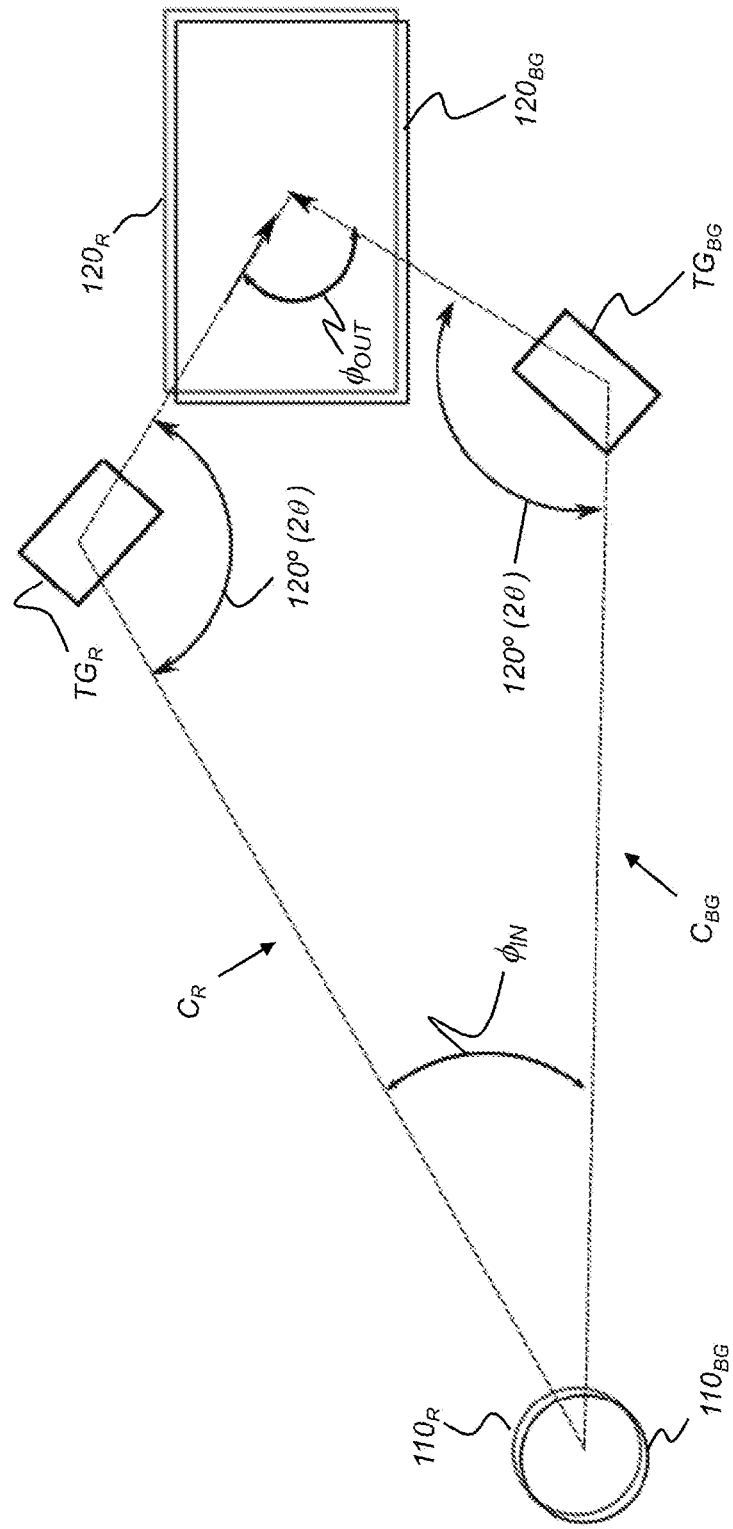
FIG. 6 is a top view that shows components of a double-sided light guide according to another approach with different angular relationships among the diffractive optics associated with opposite sides of the waveguide for separating color channels.

In FIG. 6, an alternative configuration is shown for exploiting this unexpected characteristic. As shown in FIG. 6, a grating angle difference $\phi_{IN}$ between the in-coupling diffractive optics $110_R$ and $110_{BG}$ of only about 30 degrees exhibits less color channel crosstalk than the much larger 60-degree angle $\phi$ in the arrangement of FIG. 5. Thus, crosstalk has been found to be minimized in the vicinity of angles $\phi$ centered at both 90 degrees and 30 degrees. With this configuration in which the grating angle difference $\phi_{IN}$ between the in-coupling diffractive optics $110_R$ and $110_{BG}$ is about 30 degrees, the turning angle $\theta$ can be optimally set at about 60 degrees and the grating angle difference $\phi_{OUT}$ between the out-coupling diffractive optics 120R and 120BG can also be optimally set at about 90 degrees.

Figure 7:
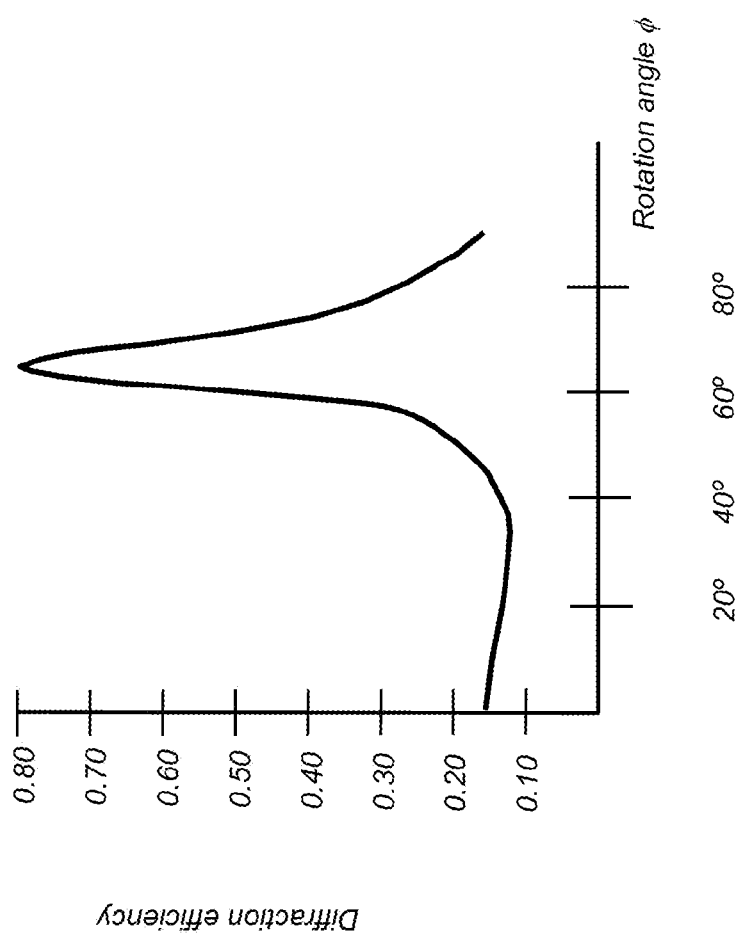
FIG. 7 is a graph that shows the relationship of rotational angle to diffraction efficiency for light moving through the waveguide at oblique angles.

The graph of FIG. 7 shows characteristic behavior for first-order reflective diffraction from a diffraction grating designed for Red light with grating spacing slightly smaller than red wavelengths, here about 510 nm. Diffraction efficiency is plotted against rotational angle $\phi$ for incident blue light at 475 nm at an approximately 40 degree incidence angle, as the light beams would be traveling through the waveguide substrate with TIR. This graph shows a general behavior characteristic that is used for turning gratings TG. In addition to this, the graph of FIG. 7 also suggests that one contributor to color channel cross-talk at particular incidence angles may be the in-coupling diffractive optics themselves.

When the diffraction gratings of in-coupling diffractive optics $110_{BG}$ and $110_R$ are rotated so that angle $\phi$ is below about 40 degrees, diffraction efficiency is less than 20% so that very little first-order diffraction of light at 40 degree angular incidence occurs. When this is the case, blue/green incident light beams at 40 degrees can simply reflect from the red in-coupling $110_R$ grating surface, as in conventional TIR. As rotation angle ϕ increases above 50 degrees, however, first order reflective diffraction increases dramatically. At 60 degrees, first-order reflective diffraction approaches a maximum, at nearly 75% for a target wavelength.

Notably, FIG. 7 shows behavior for light incident at TIR angles (exceeding 40 degree incidence). As noted above, this same effect is used for design of a turning grating TG. However, an undesirable turning grating effect can also occur in the in-coupling region of the waveguide, between in-coupling diffractive optics $110_R$ and $110_{BG}$. Where this unintended effect occurs, it may cause one or the other in-coupling diffractive optics to behave as a turning grating for light from the opposite in-coupling diffractive optic instead of allowing TIR. At efficiencies close to 80%, the opposing in-coupling then begins diverting light from its intended TIR path and re-directing some of the diverted light into the path intended for the opposite color channel. That is, red light is now inadvertently coupled into the blue-green light path and vice-versa.

Figure 8:
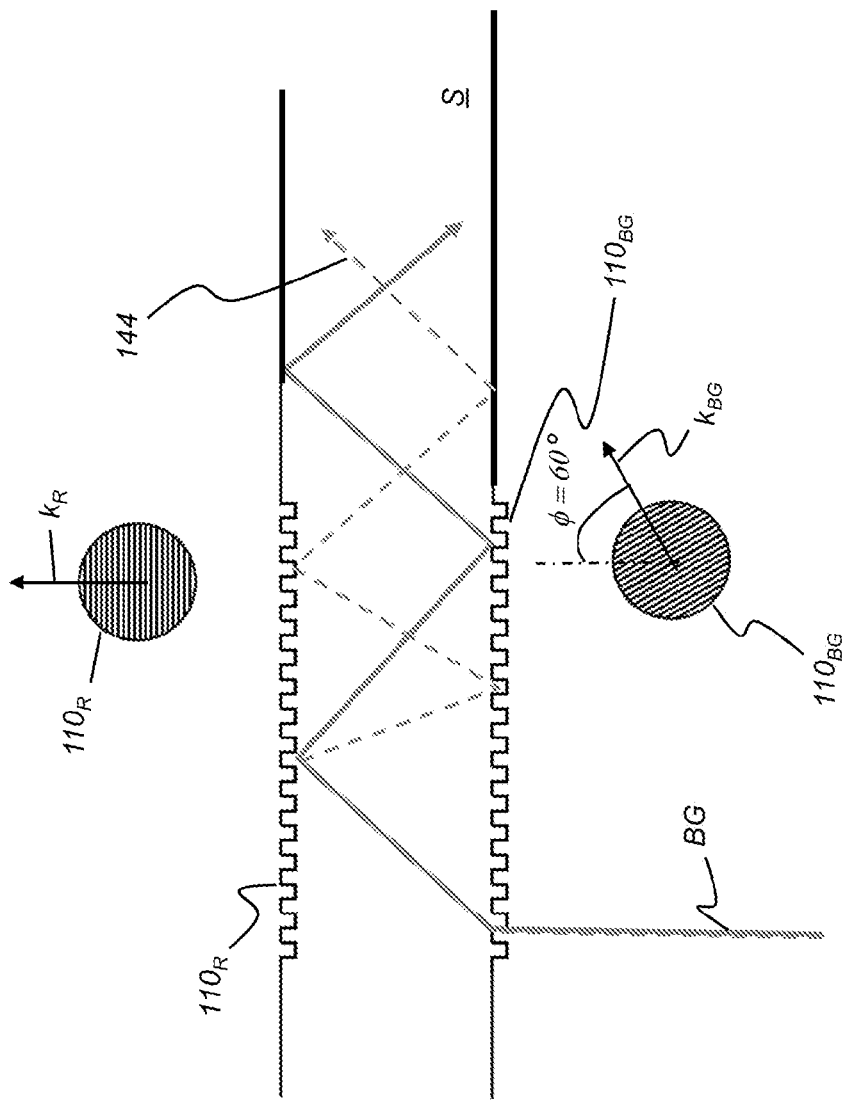
FIG. 8 is a side view that shows the input end of the light guide with opposing in-coupling diffractive optics for a double-sided diffractive beam expander also showing the effects of unintended diffraction of a beam by the opposite color channel at this point.

FIG. 8 shows this problem schematically for blue-green light BG. The intended path of this BG light is shown in solid line. The path for red light is omitted for clarity. A second BG light path 144, shown in dashed line format, indicates that some of the BG light that should be reflected from in-coupling diffractive optic $110_R$ has now been diffracted instead, and unintentionally diverted to the red light path. Thus, with in-coupling diffractive optics $110_R$ and $110_{BG}$ at a relatively high rotation angle, e.g., ϕ=60 degrees, a high degree of color crosstalk can be observed. This same effect can be true also for Red light that is incident on the in-coupling diffractive optic $110_{BG}$, effectively diverting some Red light to the blue-green path.

Comparing FIG. 8 to FIG. 4A and reviewing the graph of FIG. 7, it is shown that the angular contribution to cross-talk from in-coupling diffractive optics 110BG and 110R does not occur with gratings respectively rotated by the maximum rotation angle ϕ=90 degrees. The Applicants have found that this cross-talk effect is also negligible for rotation angles ϕ=40 degrees to 25 degrees. Thus, even though conventional design practices would avoid low rotation angles below angle ϕ=60 degrees, the Applicants have demonstrated that rotation at a significantly lower angular range, such as the ϕ=30 degree angle shown in the system of FIG. 6, provides better performance than the 60 degree rotation, with perceptibly less color channel crosstalk. Provided that the angular input field does not exceed about +/−15 degrees for each color channel, color channel crosstalk can be kept at a low level even at low rotation angles ϕ.

As is shown in FIG. 6, rotation angle ϕ in the range between 30 to 35 degrees works well for providing a double-sided imaging light guide 100 with reduced color channel crosstalk. With the angular arrangement shown, the light that is directed to out-coupling diffractive optics 120 from the two color channels $C_{BG}$ and $C_R$ is displaced by 90 degrees, allowing the rotation angle between out-coupling diffractive optics 120 to be at this advantageous 90 degree value.

Figure 9:
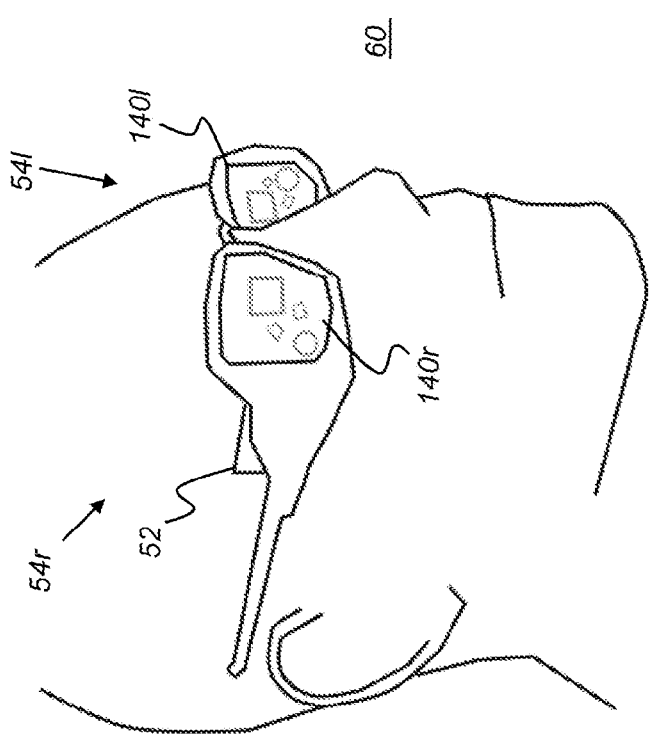
FIG. 9 is a perspective view that shows a display system for augmented reality viewing using imaging light guides of the present disclosure.

The perspective view of FIG. 9 shows a display system 60 for three-dimensional (3-D) augmented reality viewing using imaging light guides of the present disclosure. Display system 60 is shown as an HMD with a left-eye optical system 54l having a beam expander 140l for the left eye and a corresponding right-eye optical system 54r having a beam expander 140r for the right eye. An image source 52, such as a picoprojector or similar device, can be provided, energizable to generate a separate image for each eye, formed as a virtual image with the needed image orientation for upright image display. The images that are generated can be a stereoscopic pair of images for 3-D viewing. The virtual image that is formed by the optical system can appear to be superimposed or overlaid onto the real-world scene content seen by the viewer. Additional components familiar to those skilled in the augmented reality visualization arts, such as one or more cameras mounted on the frame of the HMD for viewing scene content or viewer gaze tracking, can also be provided.

Figure 10:
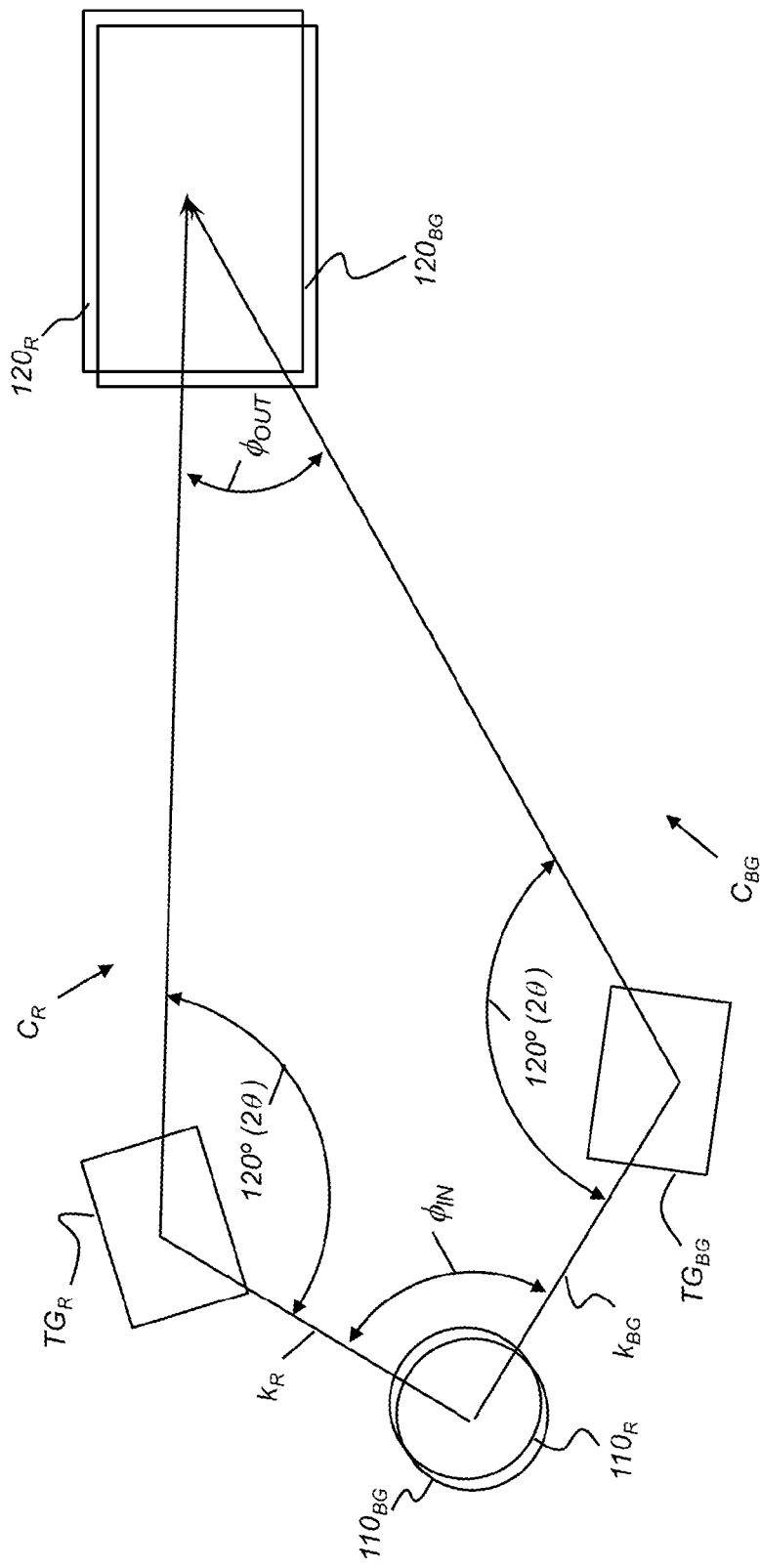
FIG. 10 is a plan view that shows an alternate embodiment in which out-coupling diffractive optics in the respective color channels are rotated 30 degrees with respect to each other.

According to an alternate embodiment of the present disclosure, as shown in FIG. 10, the relationship of the respective rotational angles can be reversed, so that the facing in-coupling diffractive optics $110_R$ and $110_{BG}$, oriented ϕ=30 degrees in the FIG. 6 orientation, are oriented at 90 degrees with respect to each other and the facing out-couplings $120_R$ and $120_{BG}$ are rotated at only 30 degrees with respect to each other. As with the FIG. 6 embodiment having only 30 degree rotation at in-coupling diffractive optics, color crosstalk is similarly less perceptible with the FIG. 10 arrangement, where there is 90 degree rotation at the in-coupling diffractive optics ϕ=90 degrees). Stated more generally, color crosstalk can be reduced where the in-coupling diffractive optics for the different channels are rotated respectively at either 30 degrees or at 90 degrees. Because of the varying behavior of the diffractive optics with light of varying angular incidence, color crosstalk can be reduced, with 30 or 90 degree respective rotation of facing diffractive gratings, over crosstalk levels where there is 60 degree rotation of those same components.

Although in the above examples the front and back surfaces of the waveguide substrate S support pairings of diffractive optics for separately conveying different color channels, the opposite side diffractive optics can also be arranged for conveying different portions of the field of view, where the opposite side diffractive optics are optimized for conveying different angular ranges of the image-bearing light beams. That is, the diffractive optics can be optimized for diffracting different ranges of wavelengths or different ranges of incident angles or a combination of the two.

In addition, the two-sided light guides for conveying different ranges of wavelengths or different angularly distinguished portions of the field of view can be combined with other single or two-sided light guides in a stack as previously practiced for single-sided waveguides to further separate the conveyance of different ranges or wavelengths or portions of the field of view. For example, a compound imaging light guide can be provided with three separate color channels, formed using a double-sided light guide arranged as a beam expander for first and second wavelength bands, and using a second single-sided light guide arranged as a beam expander for the third wavelength band.

Figure 11A:
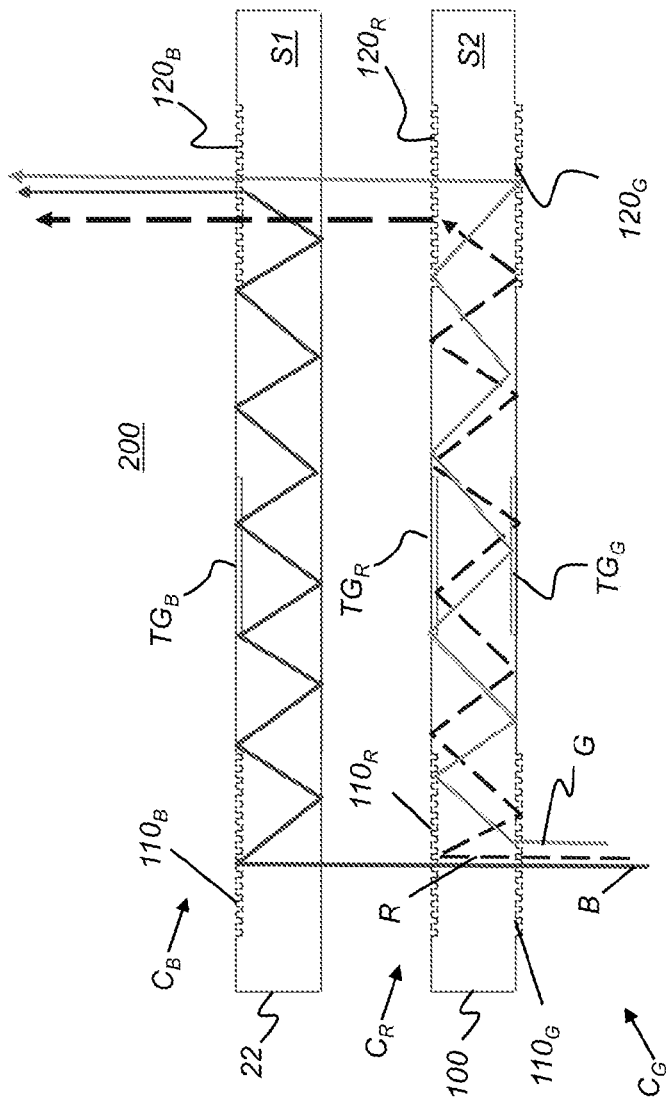
FIG. 11A is an exploded side view that shows a stacked imaging light guide assembly.
Figure 11B:
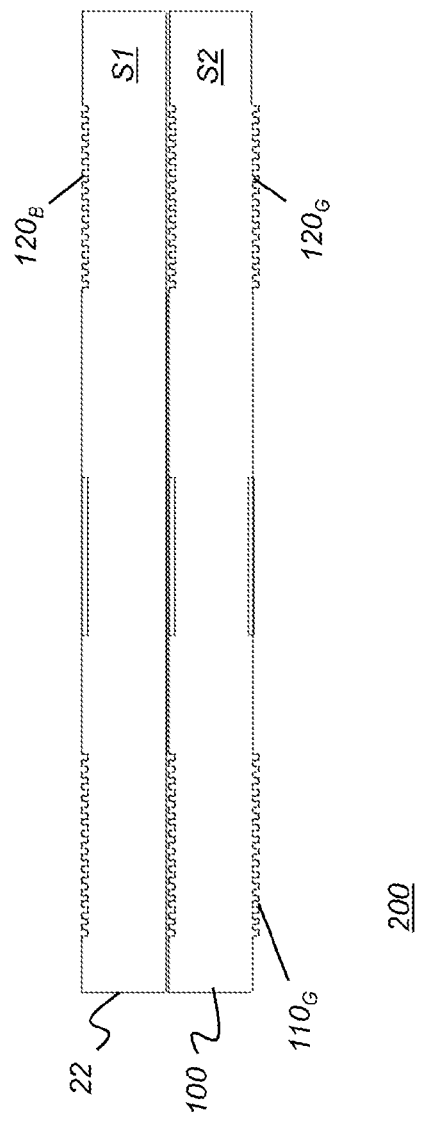
FIG. 11B is a side view that shows an assembled stacked imaging light guide assembly.

An exploded side view diagram of FIG. 11A and an assembled side view of FIG. 11B show, in simplified form and not intending to show actual scale, a stacked imaging light guide assembly 200 having a double-sided light guide 100 that is coupled with a single-sided imaging light guide 22. Light guides 100 and 22 are formed on separate waveguide substrates S1 and S2 that can be adhesively or mechanically coupled so that stacked imaging light guide assembly 200 provides three separate color channels. FIG. 11A shows one alternative arrangement, in which double-sided light guide 100 has a red channel CR for Red light R (in the 630-660 nm range) and a green channel CG for Green light G (in the 500-540 nm range). Imaging light guide 22 then has a single blue channel CB for Blue light B (in the 440-470 nm range). FIG. 11A shows the paths of light in the respective color channels for this stacked arrangement. Blue light B transmits through both in-coupling diffractive optics $110_G$ and $110_R$ and is diffracted at in-coupling diffractive optic $110_B$. The diffracted blue B light is then conveyed by TIR along waveguide substrate S1, through turning grating $TG_B$, and to out-coupling diffractive optic $120_B$. The red light R is also input at in-coupling diffractive optic $110_G$, is diffracted reflectively at in-coupling diffractive optic $110_R$ and is conveyed by TIR to turning grating $TG_R$ and to out-coupling diffractive optic $120_R$. The green light G is also input at in-coupling diffractive optic $110_G$ and is diffracted there. This beam is conveyed through waveguide substrate S2 via TIR to turning grating $TG_G$ and to out-coupling diffractive optic $120_G$. As with the two-channel embodiments described herein, the in-coupling diffractive optics on the double-sided beam expander used in a stacked arrangement are rotated so that their respective grating vectors are 25-40 degrees from each other within substrate S1.

It can be appreciated that the embodiment shown in FIGS. 11A and 11B is one of a number of possible arrangements of stacked imaging light guide assembly 200 and its color channels $C_R$, $C_G$, $C_B$. Double-sided light guide 100 can be stacked above or below single-sided imaging light guide 22. Coupling of two double-sided light guides 100 can provide four color channels in a similar manner.

Imaging Light Guide Fabrication

Various processes can be used to fabricate and assemble the imaging light guides. In-coupling diffractive optics 110 and out-coupling diffractive optics 120 can be diffraction gratings or formed as volume holograms, or formed from a holographic polymer dispersed liquid crystal, for example. At least one of the in-coupling and out-coupling diffractive optics can be a surface relief diffraction grating. The waveguide substrate of the imaging light guide is a transparent optical material, typically glass or optical polymer material with sufficient index of refraction for supporting TIR transmission between in-coupling diffractive optic, turning grating, and out-coupling diffractive optic.

In-coupling diffractive optics 110, turning gratings TG, and out-coupling diffractive optics 120 have different grating periods appropriate to their respective color channels. Typically the grating pitch, or grating period, is a value from 75 to about 90 percent of the central wavelength for a color channel. For example, the in-coupling diffractive optic $110_R$ for the red channel (620-670 nm), in an exemplary embodiment, has a period of 510 nm, a depth of 205 nm, 50/50 fill, and a 45-degree slant.

After proper surface preparation of a glass substrate blank, the diffraction components are formed on one or both outer surfaces of the waveguide substrate S using nanoimprinting methods, for example. At least one of the in-couplings and out-couplings can be a surface relief diffraction grating.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. An imaging light guide comprising:
   a waveguide operable to convey image-bearing light beams from an image source to an eyebox within which a virtual image can be viewed;
   a first in-coupling diffractive optic disposed to direct a first set of the image-bearing light beams into the waveguide along a first path;
   a first turning diffractive optic disposed along the first path and arranged to expand the image-bearing light beams of the first set in a first dimension and to direct the expanded image-bearing light beams of the first set to a first out-coupling diffractive optic;
   wherein the first out-coupling diffractive optic is arranged to further expand the image-bearing light beams of the first set in a second dimension and to direct the further expanded image-bearing light beams of the first set from the waveguide toward the eyebox;
   a second in-coupling diffractive optic disposed to direct a second set of the image-bearing light beams into the waveguide along a second path that is different from the first path; and
   a second turning diffractive optic disposed along the second path and arranged to expand the image-bearing light beams of the second set in a first dimension and to direct the expanded image-bearing light beams of the second set to a second out-coupling diffractive optic;
   wherein the second out-coupling diffractive optic is arranged to further expand the image-bearing light beams of the second set in a second dimension and to direct the further expanded image-bearing light beams of the second set from the waveguide toward the eyebox;
   wherein the first in-coupling diffractive optic has a corresponding first in-coupling grating vector and the second in-coupling diffractive optic has a corresponding second in-coupling grating vector; and the first in-coupling grating vector is oriented at an angle of 25 to 40 degrees relative to the second in-coupling grating vector.

2. The imaging light guide of claim 1 wherein the first out-coupling diffractive optic has a first out-coupling grating vector, the second out-coupling diffractive optic has a second out-coupling grating vector, and the first out-coupling grating vector is oriented away from the second out-coupling grating vector.

3. The imaging light guide of claim 2 wherein the first out-coupling grating vector is oriented away from the second out-coupling grating vector by 90 degrees.

4. The imaging light guide of claim 1 wherein the waveguide includes a substrate with parallel front and back surfaces, the first in-coupling diffractive optic and the second in-coupling diffractive optic are aligned along a common normal to the front and back surfaces of the substrate, and the first turning diffractive optic and the second turning diffractive optic are not aligned along a common normal to the front and back surfaces of the substrate.

5. The imaging light guide of claim 3 wherein the waveguide includes a substrate with parallel front and back surfaces, the first out-coupling diffractive optic and the second out-coupling diffractive optic are aligned along a common normal to the front and back surfaces of the substrate, and the first turning diffractive optic and the second turning diffractive optic are not aligned along a common normal to the front and back surfaces of the substrate.

6. The imaging light guide of claim 1 wherein the first in-coupling diffractive optic is a volume hologram.

7. The imaging light guide of claim 1 wherein the first in-coupling diffractive optic is a diffraction grating.

8. The imaging light guide of claim 1 in which the waveguide includes a planar substrate.

9. The imaging light guide of claim 1 wherein the first set of image-bearing light beams comprises a first range of wavelengths and the second set of image-bearing light beams comprises a second range of wavelengths that differs from the first range of wavelengths.

10. The imaging light guide of claim 1 wherein the first set of image-bearing light beams comprises a first range of angularly related beams and the second set of image-bearing light beams comprises a second range of angularly related beams that differs from the first range of angularly related beams.

11. The imaging light guide of claim 1 wherein the first in-coupling grating vector is oriented away from the second in-coupling grating vector by 30 degrees.

12. An imaging light guide comprising:
a waveguide operable to convey image-bearing light beams from an image source to an eyebox within which a virtual image can be viewed;
a first in-coupling diffractive optic disposed to direct a first set of the image-bearing light beams into the waveguide along a first path;
a first turning diffractive optic disposed along the first path and arranged to expand the image-bearing light beams of the first set in a first dimension and to direct the expanded image-bearing light beams of the first set to a first out-coupling diffractive optic;
the first out-coupling diffractive optic arranged to further expand the image-bearing light beams of the first set in a second dimension and to direct the further expanded image-bearing light beams of the first set from the waveguide toward the eyebox;
a second in-coupling diffractive optic disposed to direct a second set of the image-bearing light beams into the waveguide along a second path that is different from the first path;
a second turning diffractive optic disposed along the second path and arranged to expand the image-bearing light beams of the second set in a first dimension and to direct the expanded image-bearing light beams of the second set to a second out-coupling diffractive optic; and
the second out-coupling diffractive optic being arranged to further expand the image-bearing light beams of the second set in a second dimension and to direct the further expanded image-bearing light beams of the second set from the waveguide toward the eyebox;
wherein the first out-coupling diffractive optic has a first out-coupling grating vector, the second out-coupling diffractive optic has a second out-coupling grating vector, and the first out-coupling grating vector is oriented at an angle of 25 to 40 degrees relative to the second out-coupling grating vector.

13. The imaging light guide of claim 12 wherein the first in-coupling diffractive optic has a first in-coupling grating vector, the second in-coupling diffractive optic has a second in-coupling grating vector, and the first in-coupling grating vector is oriented away from the second in-coupling grating vector.

14. The imaging light guide of claim 13 wherein the first in-coupling grating vector is oriented away from the second in-coupling grating vector by 90 degrees.

15. The imaging light guide of claim 12 wherein:
the waveguide includes a substrate with parallel front and back surfaces,
the first in-coupling diffractive optic and the second in-coupling diffractive optic are aligned along a first common normal to the front and back surfaces of the substrate,
the first turning diffractive optic and the second turning diffractive optic are not aligned along a common normal to the front and back surfaces of the substrate, and
the first out-coupling diffractive optic and the second out-coupling diffractive optic are aligned along a second common normal to the front and back surfaces of the substrate.

* * * * *